(12) United States Patent
Chen

(10) Patent No.: US 11,307,456 B2
(45) Date of Patent: Apr. 19, 2022

(54) BACKLIGHT MODULE AND DISPLAY DEVICE

(71) Applicant: TCL CHINA STAR OPTOELECTRONICS TECHNOLOGY CO., LTD., Shenzhen (CN)

(72) Inventor: Zhenxia Chen, Shenzhen (CN)

( * ) Notice: Subject to any disclaimer, the term of this patent is extended or adjusted under 35 U.S.C. 154(b) by 116 days.

(21) Appl. No.: 16/650,393

(22) PCT Filed: Mar. 13, 2020

(86) PCT No.: PCT/CN2020/079108
§ 371 (c)(1),
(2) Date: Mar. 25, 2020

(87) PCT Pub. No.: WO2021/155624
PCT Pub. Date: Aug. 12, 2021

(65) Prior Publication Data
US 2021/0397047 A1   Dec. 23, 2021

(30) Foreign Application Priority Data

Feb. 4, 2020   (CN) .......................... 202010079496.1

(51) Int. Cl.
*G02F 1/13357* (2006.01)
*G02F 1/1335* (2006.01)

(52) U.S. Cl.
CPC .. *G02F 1/133605* (2013.01); *G02F 1/133603* (2013.01); *G02F 1/133612* (2021.01)

(58) Field of Classification Search
CPC ......... G02F 1/133605; G02F 1/133603; G02F 1/133612
See application file for complete search history.

(56) References Cited

U.S. PATENT DOCUMENTS

| | | | |
|---|---|---|---|
| 2007/0121318 A1 | 5/2007 | Nanbu | |
| 2007/0138946 A1* | 6/2007 | Cok | H01L 27/3276 313/504 |
| 2010/0327300 A1* | 12/2010 | Epler | H01L 33/405 257/98 |
| 2013/0328077 A1* | 12/2013 | Chen | H01L 33/405 257/98 |
| 2019/0056824 A1* | 2/2019 | Ichiki | G06F 3/0445 |
| 2019/0235672 A1* | 8/2019 | Ichiki | G02B 1/14 |

FOREIGN PATENT DOCUMENTS

| | | |
|---|---|---|
| CN | 109461376 A | 3/2019 |
| CN | 110133914 A | 8/2019 |
| CN | 110398857 A | 11/2019 |
| EP | 1791020 A1 | 5/2007 |

OTHER PUBLICATIONS

English machine translation of Hefei CN109461376 (Year: 2019).*

* cited by examiner

*Primary Examiner* — Evan P Dzierzynski

(57) ABSTRACT

The present disclosure provides a backlight module and a display device. The backlight module includes a substrate, mini LEDs, and at least one conductive reflective layer. The substrate includes a light-emitting area and a non-light-emitting area surrounding the light-emitting area. The mini LEDs are disposed in the light-emitting area of the substrate. The conductive reflective layer covers the whole non-light-emitting area, and the mini LEDs are electrically connected to one conductive reflective layer.

9 Claims, 4 Drawing Sheets

BACKLIGHT MODULE AND DISPLAY DEVICE

FIELD OF INVENTION

The present disclosure relates to the field of display devices, and more particularly, to a backlight module and a display device.

BACKGROUND OF INVENTION

With development of technology and social progress, people are increasingly dependent on information exchange and transmission. As a main carrier and a material foundation for information exchange and transmission, display devices have become a hotspot and high ground for many scientists engaged in information optoelectronics. Requirements for realistic image quality are getting higher, wherein, requirements for high brightness backlights are getting higher.

Liquid crystal display (LCD) screens mainly consist of liquid crystal cells and backlights. Backlights are an important component of liquid crystal display screens. LCDs have a non-active light-emitting display mode, and a display light source thereof is provided by a backlight. Therefore, optical characteristics of backlights are closely related to display characteristics of an entire liquid crystal display screen.

The most common backlight used in LCDs is LED lamp beads used as a light source, and assisted by films such as a light guide plate, a diffusion film, a reflective film, and a prism film, a relatively uniform surface light source is obtained. Compared to the former, current newly developed mini LED backlights can obtain a more uniform surface light source, which has larger viewing angles and can achieve an ultra-dark state to obtain a more realistic effect. However, its light utilization rate has yet to achieve an optimal level, and loses light when light is reflected downward from a diffusion film, which does not well utilize light emitted from mini LEDs.

As shown in FIG. 1, a current backboard design of mini LED backlights is mainly divided into a non-metal covering area 40 and a single-layered metal covering area 50. As shown in FIG. 2, in the non-metal covering area 40, light reflected downward from a diffusion film 60 cannot be well utilized. Through simulation calculation, it can be obtained that reflective effects in the two areas are different, wherein reflectivity in the non-metal covering area 40 is only about 22%, while reflectivity in the single-layered metal covering area 50 is also low at only about 61%.

Technical problem: an objective of the present disclosure is to provide a backlight module and a display device to solve the problem that reflectivity of light sources is not high enough in current mini LED backlight modules.

SUMMARY OF INVENTION

In order to achieve the above objective, the present disclosure provides a backlight module. The backlight module includes a substrate, a plurality of mini LEDs, and at least one conductive reflective layer. The substrate includes a light-emitting area and a non-light-emitting area surrounding the light-emitting area. The mini LEDs are disposed in the light-emitting area of the substrate. The conductive reflective layer covers the whole non-light-emitting area, and the mini LEDs are electrically connected to one conductive reflective layer.

Further, the conductive reflective layer comprises a first conductive reflective layer, a transparent insulating layer, and a second conductive reflective layer. The first conductive reflective layer is disposed on the substrate. The transparent insulating layer is disposed on the first conductive reflective layer. The second conductive reflective layer is disposed on the transparent insulating layer. Wherein, the mini LEDs are electrically connected to the first conductive reflective layer and/or the second conductive reflective layer.

Further, the backlight module further comprises at least one open groove defined in the second conductive reflective layer, wherein the mini LEDs correspond to the open groove and is electrically connected to the first conductive reflective layer.

Further, the second conductive reflective layer comprises at least one of first reflective wirings and at least one of second reflective wirings in parallel with each other. Widths of the second reflective wirings are less than widths of the first reflective wirings. A first gap is defined between the first reflective wirings, the second reflective wirings, or one of the first reflective wirings and one of the second reflective wirings, and the open groove corresponds to the first reflective wirings and the first gap adjacent to the first reflective wirings.

Further, the second conductive reflective layer comprises at least two third reflective wirings in parallel with each other, and each open groove corresponds to one of the third reflective wirings.

Further, the first conductive reflective layer comprises at least two fourth reflective wirings in parallel with each other. A second gap is defined between two of the adjacent fourth reflective wirings, and the second gap corresponds to one of the first reflective wirings, one of the second reflective wirings, one of the third reflective wirings, or two of them.

Further, a width of the first gap is less than a width of the fourth reflective wirings. A width of the second gap is less than a width of the second reflective wirings or the third reflective wirings.

Further, a third gap is disposed between two of the adjacent third reflective wirings, and the third gap corresponds to one of the fourth reflective wirings.

Further, a width of the third gap is less than the width of the fourth reflective wirings.

Further, the first conductive reflective layer comprises at least two fifth reflective wirings in parallel with each other, a fourth gap is defined between two of the adjacent fifth reflective wirings, the second conductive reflective layer comprises at least two sixth reflective wirings in parallel with each other, and the fourth gap corresponds to one of the sixth reflective wirings.

Further, a fifth gap is defined between two of the adjacent sixth reflective wirings, and the fifth gap corresponds to one of the fifth reflective wirings.

Further, a width of the fourth gap is less than a width of the sixth reflective wirings. A width of the fifth gap is less than a width of the fifth reflective wirings.

The present disclosure further provides a display device. The display device comprises the above backlight module.

Beneficial effect: advantages of the present disclosure is that the backlight module and the display device of the present disclosure can improve reflectivity of light in the backlight module, decrease loss rate of light sources, and improve utilization of the light sources by reducing an area in a non-metal area and increasing a covering area of metals by covering with two layers of metal wirings. In a situation having a same brightness requirement, the present disclosure can reduce an amount of mini LEDs, save production cost, and reduce electrical energy required for the display device, thereby saving energy.

DETAILED DESCRIPTION OF PREFERRED EMBODIMENTS

Figure 1:
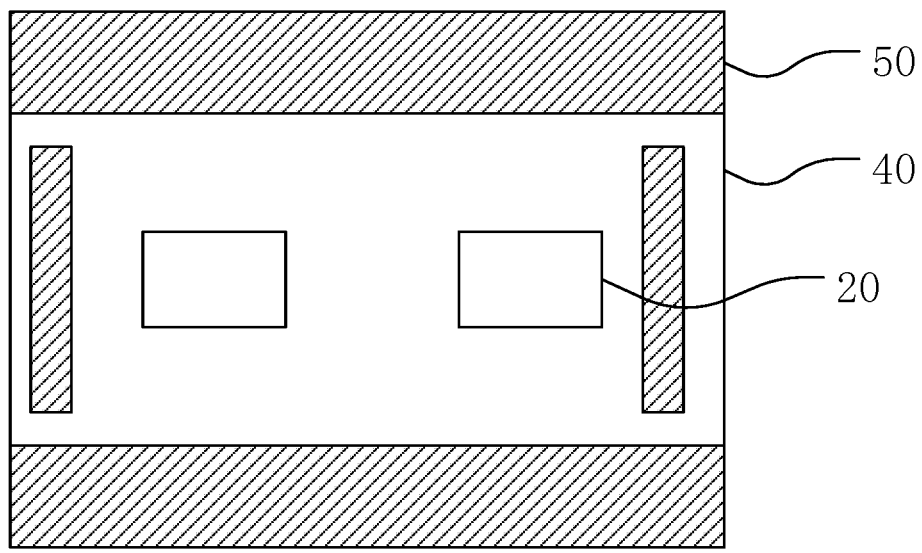
FIG. 1 is a schematic top view of a backlight module in current technology.
Figure 2:
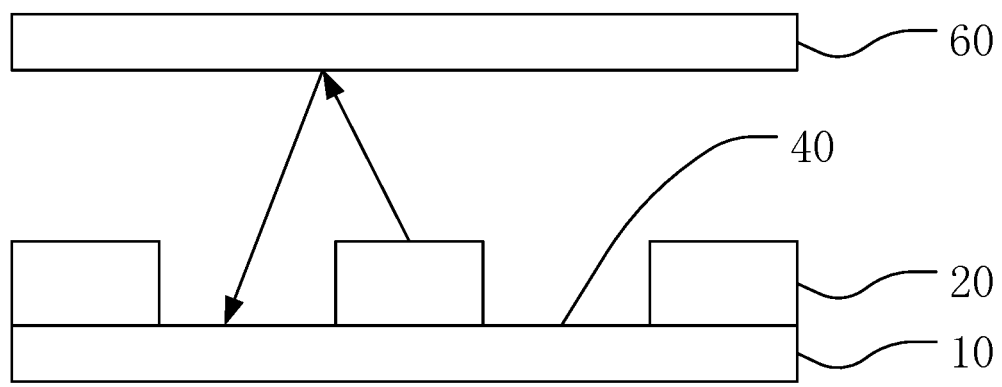
FIG. 2 is a schematic layered structural diagram of a backlight module in current technology.

The preferred embodiments of the present disclosure are described in detail below with reference to the accompanying drawings. The specific embodiments described with reference to the attached drawings are all exemplary and are intended to illustrate and interpret the present disclosure to make the skilled in the art easier to understand how to implement the present disclosure. The disclosure herein provides many different embodiments or examples for realizing different structures of the present disclosure. They are only examples and are not intended to limit the present disclosure.

In the accompanying drawings, wherein the identical or similar reference numerals constantly denote the identical or similar elements or elements having the identical or similar functions. In the drawings, structurally identical components are denoted by the same reference numerals, and structural or functionally similar components are denoted by like reference numerals. Moreover, a size and a thickness of each component shown in the drawings are arbitrarily shown, and the present disclosure does not limit the size and thickness of each component. In order to make the drawings clearer, thicknesses of some components in the drawings are appropriately exaggerated.

Besides, the specific embodiments described with reference to the attached drawings are all exemplary and are intended to illustrate and interpret the present disclosure. In the description of the present disclosure, it should be understood that terms such as "upper", "lower", "front", "rear", "left", "right", "inside", "outside", "side", as well as derivative thereof should be construed to refer to the orientation as described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance.

When a component is described as "on" another component, the component can be placed directly on the other component; an intermediate component can also exist, the component is placed on the intermediate component, and the intermediate component is placed on another component. When a component is described as "installed to" or "connected to" another component, it can be understood as directly "installed to" or "connected to", or a component is "mounted to" or "connected to" another component through an intermediate component.

Embodiment 1

The embodiment of the present disclosure provides a display device. The display device has a backlight module 1 and is a liquid crystal display device. A liquid crystal layer in the liquid crystal display device is a passive light-emitting element, so it needs the backlight module 1 to provide a backlight source, thereby achieving image display. The display device provided in the embodiment of the present disclosure may be devices having image display function, such as a laptop, a mobile phone, a tablet, or a TV.

Figure 3:
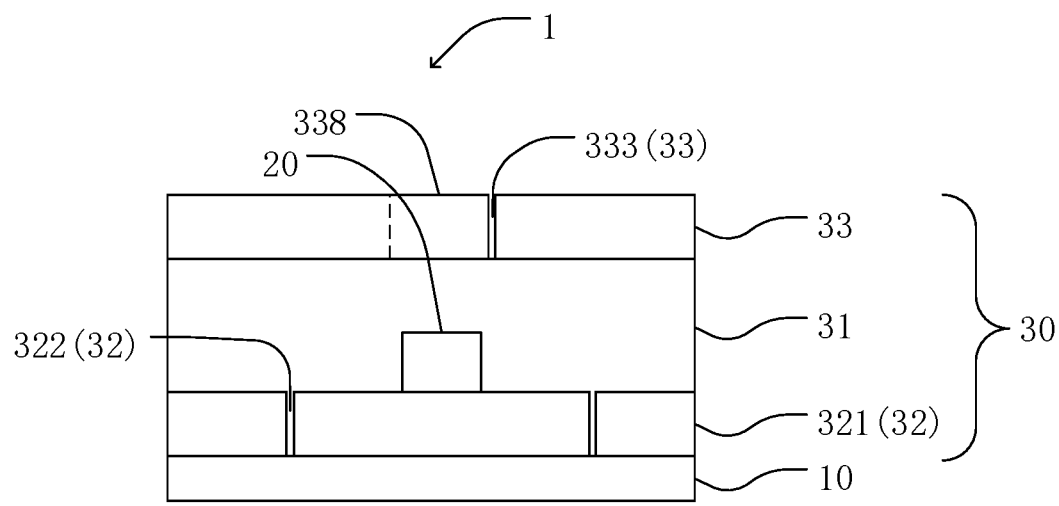
FIG. 3 is a schematic layered structural diagram of a backlight module according to embodiment 1 of the present disclosure.

As shown in FIG. 3, the backlight module 1 includes a substrate 10, a plurality of mini LEDs 20, and a conductive reflective layer 30.

The substrate 10 is a transparent insulating substrate, such as a glass substrate, a quartz substrate, etc. The substrate 10 is used to protect overall structure of the display panel.

The substrate 10 comprises a light-emitting area 11 and a non-light-emitting area 12 surrounding the light-emitting area 11, and the mini LEDs 20 are disposed in the light-emitting area 11. The mini LEDs 20 are used to provide a backlight source.

The conductive reflective layer 30 is disposed on the substrate 10. The conductive reflective layer 30 comprises a first conductive reflective layer 32, a transparent insulating layer 31, and a second conductive reflective layer 33. Wherein, the first conductive reflective layer 32 and the second conductive reflective layer 33 are metals, and the mini LEDs 20 are electrically connected to the first conductive reflective layer 32.

The first conductive reflective layer 32 is disposed on the substrate 10 and covers the entire substrate 10. The mini LEDs 20 are disposed on the first conductive reflective layer 32 and are electrically connected to the first conductive reflective layer 32. The first conductive reflective layer 32 transmits power to the mini LEDs 20, so that the mini LEDs 20 can emit light. Meanwhile, the first conductive reflective layer 32 can also reflect light for the mini LEDs 20 to improve utilization of light.

The second conductive reflective layer 33 is insulatedly disposed on a surface of the first conductive reflective layer 32 away from the substrate 10 and covers the non-light-emitting area 12. The second conductive reflective layer 33 is used to reflect light emitted from the mini LEDs 20. The second conductive reflective layer 33 has an open groove 338 penetrating through the second conductive reflective layer 33 and corresponding to the mini LEDs 20. The open groove 338 provides a light-emitting channel for the mini LEDs 20.

The transparent insulating layer 31 is disposed between the first conductive reflective layer 32 and the second conductive reflective layer 33 and is used to insulate the first conductive reflective layer 32 from the second conductive reflective layer 33 to prevent short circuits.

Figure 4:
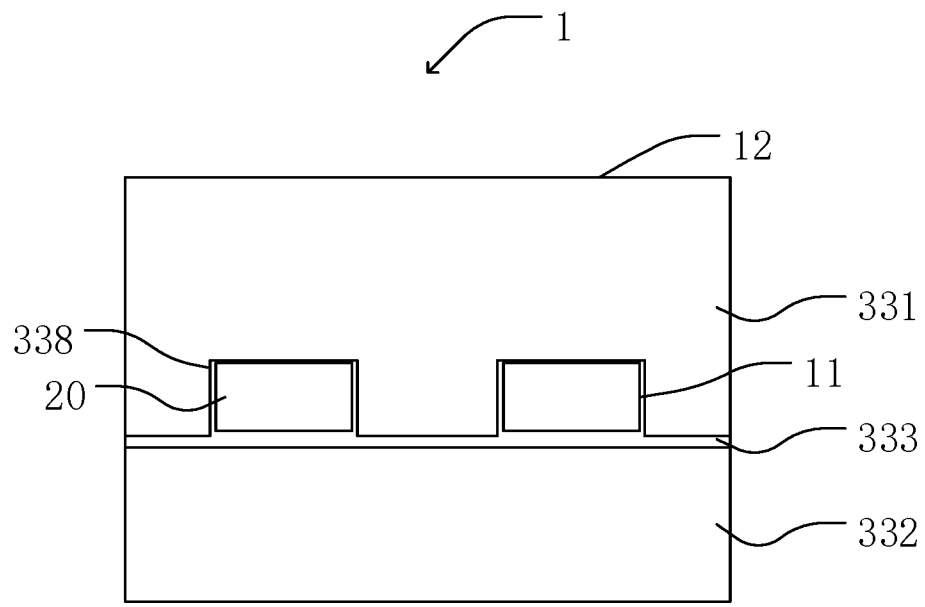
FIG. 4 is a schematic top view of a backlight module according to embodiment 1 of the present disclosure.

As shown in FIG. 4, the second conductive reflective layer 33 comprises a plurality of first reflective wirings 331 and a plurality of second reflective wirings 332. The first reflective wirings 331 and the second reflective wirings 332 are disposed alternatingly and in parallel to each other. Wherein, widths of the second reflective wirings 332 are less than widths of the first reflective wirings 331. A first gap 333 is defined between the first reflective wirings 331 and the second reflective wirings 332, and the open groove 338 corresponds to the first reflective wirings 331 and the first gap 333 adjacent to the first reflective wirings 331.

The first conductive reflective layer 32 comprises a plurality of fourth reflective wirings 321 arranged on the substrate 10. Two of the adjacent fourth reflective wirings 321 are in parallel with each other and a second gap 322 is defined between them. The mini LEDs 20 are disposed on a part of the fourth reflective wirings 321.

The first gap 333 corresponds to the fourth reflective wirings 321, and the second gap 322 corresponds to the first reflective wirings 331 or the second reflective wirings 332. In addition, a width of the first gap 333 is less than widths of the second reflective wirings 332, and a width of the second gap 322 is less than the widths of the second reflective wirings 332, thereby achieving full metal coverage. When the mini LEDs 20 light up, most light can be emitted outside through the open groove 338, and a part of light is reflected from the fourth reflective wirings 321 (that is first conductive reflective layer 32) and emitted outside through the first gap 333 or the open groove 338. The first reflective wirings 331 and the second reflective wirings 332, that is the second conductive reflective layer 33, are used to reflect light that is reflected back from other optical films in the backlight module 1.

The backlight module and the display device provided in the embodiment of the present disclosure can improve reflectivity of light in the backlight module by reducing an area in a non-metal area and increasing a covering area of metals by covering with two layers of metal wirings. From simulation calculation, it can be known that the light reflectivity having coverage with two layers of metal wirings can reach 70% or even higher. Compared to current technology, the backlight module disclosed in the embodiment of the present disclosure has a higher reflectivity and a lower loss rate of light sources. In a situation having a same brightness requirement, the present disclosure can reduce an amount of mini LEDs, save production cost, and reduce electrical energy required for the display device, thereby saving energy.

Embodiment 2

The embodiment of the present disclosure provides a display device. The display device has a backlight module 1 and is a liquid crystal display device. A liquid crystal layer in the liquid crystal display device is a passive light-emitting element, so it needs the backlight module 1 to provide a backlight source, thereby achieving image display. The display device provided in the embodiment of the present disclosure may be devices having image display function, such as a laptop, a mobile phone, a tablet, or a TV.

Figure 5:
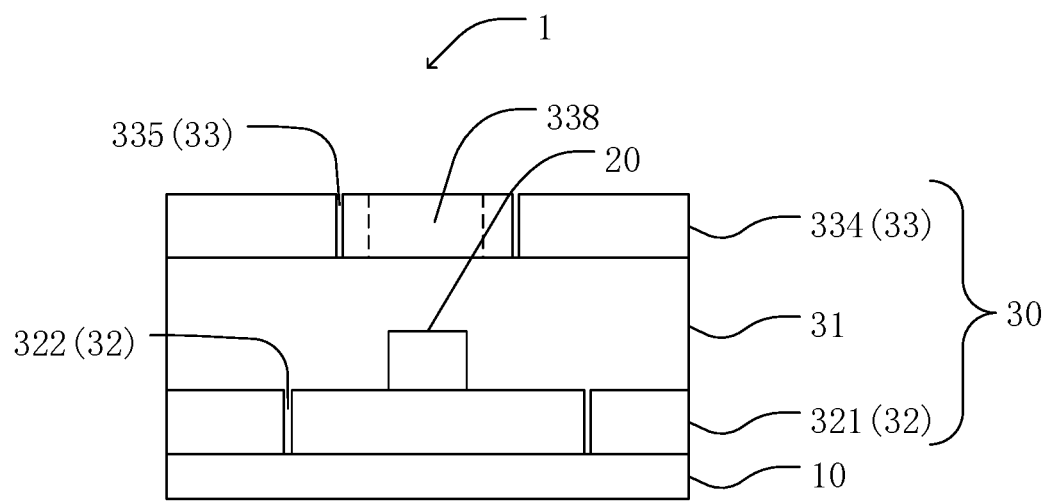
FIG. 5 is a schematic layered structural diagram of a backlight module according to embodiment 2 of the present disclosure.

As shown in FIG. 5, the backlight module 1 includes a substrate 10, a plurality of mini LEDs 20, and a conductive reflective layer 30.

The substrate 10 is a transparent insulating substrate, such as a glass substrate, a quartz substrate, etc. The substrate 10 is used to protect overall structure of the display panel.

The substrate 10 comprises a light-emitting area 11 and a non-light-emitting area 12 surrounding the light-emitting area 11, and the mini LEDs 20 are disposed in the light-emitting area 11. The mini LEDs 20 are used to provide a backlight source.

The conductive reflective layer 30 is disposed on the substrate 10. The conductive reflective layer 30 comprises a first conductive reflective layer 32, a transparent insulating layer 31, and a second conductive reflective layer 33. Wherein, the first conductive reflective layer 32 and the second conductive reflective layer 33 are metals, and the mini LEDs 20 are electrically connected to the first conductive reflective layer 32.

The first conductive reflective layer 32 is disposed on the substrate 10 and covers the entire substrate 10. The mini LEDs 20 are disposed on the first conductive reflective layer 32 and are electrically connected to the first conductive reflective layer 32. The first conductive reflective layer 32 transmits power to the mini LEDs 20, so that the mini LEDs 20 can emit light. Meanwhile, the first conductive reflective layer 32 can also reflect light for the mini LEDs 20 to improve utilization of light.

The second conductive reflective layer 33 is insulatedly disposed on a surface of the first conductive reflective layer 32 away from the substrate 10 and covers the non-light-emitting area 12. The second conductive reflective layer 33 is used to reflect light emitted from the mini LEDs 20. The second conductive reflective layer 33 has an open groove 338 penetrating through the second conductive reflective layer 33 and corresponding to the mini LEDs 20. The open groove 338 provides a light-emitting channel for the mini LEDs 20.

The transparent insulating layer 31 is disposed between the first conductive reflective layer 32 and the second conductive reflective layer 33 and is used to insulate the first conductive reflective layer 32 from the second conductive reflective layer 33 to prevent short circuits.

Figure 6:
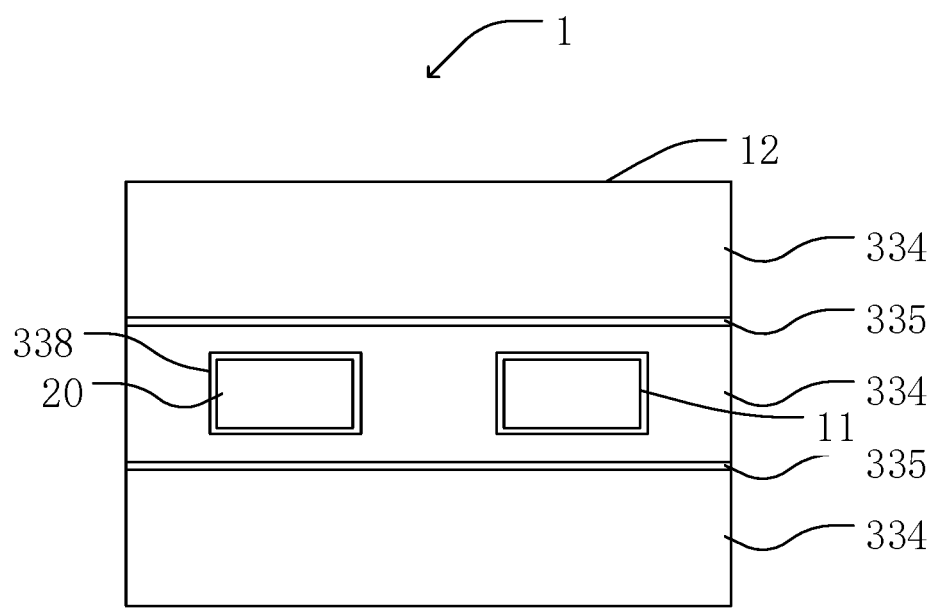
FIG. 6 is a schematic top view of a backlight module according to embodiment 2 of the present disclosure.

As shown in FIG. 6, the second conductive reflective layer 33 comprises a plurality of third reflective wirings 334. Two of the adjacent third reflective wirings 334 are in parallel with each other and a third gap 335 is defined between them. The open groove 338 is correspondingly positioned in the third reflective wirings 334.

The first conductive reflective layer 32 comprises a plurality of fourth reflective wirings 321 arranged on the substrate 10. Two of the adjacent fourth reflective wirings 321 are in parallel with each other and a second gap 322 is defined between them. The mini LEDs 20 are disposed on a part of the fourth reflective wirings 321.

The second gap 322 corresponds to the third reflective wirings 334, and the third gap 335 corresponds to the fourth reflective wirings 321. In addition, a width of the second gap 322 is less than widths of the third reflective wirings 334, and a width of the third gap 335 is less than widths of the fourth reflective wirings 321, thereby achieving full metal coverage. When the mini LEDs 20 light up, most light can be emitted outside through the open groove 338, and a part of light is reflected from the fourth reflective wirings 321 (that is first conductive reflective layer 32) and emitted outside through the first gap 333 or the open groove 338. The third reflective wirings 334, that is the second conductive reflective layer 33, is used to reflect light that is reflected back from other optical films in the backlight module 1.

The backlight module and the display device provided in the embodiment of the present disclosure can improve reflectivity of light in the backlight module by reducing an area in a non-metal area and increasing a covering area of metals by covering with two layers of metal wirings. From simulation calculation, it can be known that the light reflectivity having coverage with two layers of metal wirings can reach 70% or even higher. Compared to current technology, the backlight module disclosed in the embodiment of the present disclosure has a higher reflectivity and a lower loss rate of light sources. In a situation having a same brightness requirement, the present disclosure can reduce an amount of mini LEDs, save production cost, and reduce electrical energy required for the display device, thereby saving energy.

Embodiment 3

The embodiment of the present disclosure provides a display device. The display device has a backlight module 1 and is a liquid crystal display device. A liquid crystal layer in the liquid crystal display device is a passive light-emitting element, so it needs the backlight module 1 to provide a backlight source, thereby achieving image display. The display device provided in the embodiment of the present disclosure may be devices having image display function, such as a laptop, a mobile phone, a tablet, or a TV.

Figure 7:
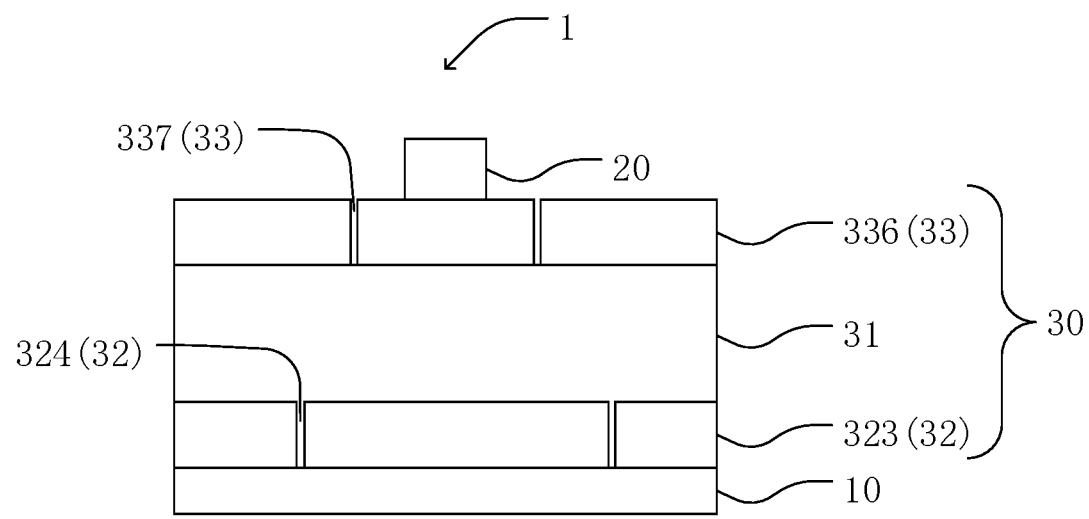
FIG. 7 is a schematic layered structural diagram of a backlight module according to embodiment 3 of the present disclosure.

As shown in FIG. 7, the backlight module 1 includes a substrate 10, a plurality of mini LEDs 20, and a conductive reflective layer 30.

The substrate 10 is a transparent insulating substrate, such as a glass substrate, a quartz substrate, etc. The substrate 10 is used to protect overall structure of the display panel.

The substrate 10 comprises a light-emitting area 11 and a non-light-emitting area 12 surrounding the light-emitting area 11, and the mini LEDs 20 are disposed in the light-emitting area 11. The mini LEDs 20 are used to provide a backlight source.

The conductive reflective layer 30 is disposed on the substrate 10. The conductive reflective layer 30 comprises a first conductive reflective layer 32, a transparent insulating layer 31, and a second conductive reflective layer 33. Wherein, the first conductive reflective layer 32 and the second conductive reflective layer 33 are metals, and the mini LEDs 20 are electrically connected to the second conductive reflective layer 33.

The first conductive reflective layer 32 is disposed on the substrate 10 and covers the entire substrate 10. The first conductive reflective layer 32 is used to reflect light leaked from the second conductive reflective layer 33.

The second conductive reflective layer 33 is insulatedly disposed on a surface of the first conductive reflective layer 32 away from the substrate 10 and covers the entire light-emitting area 11 and the non-light-emitting area 12. The mini LEDs 20 are disposed on the second conductive reflective layer 33 and are electrically connected to the second conductive reflective layer 33. The second conductive reflective layer 33 transmits power to the mini LEDs 20, so that the mini LEDs 20 can emit light. Meanwhile, the first conductive reflective layer 32 can also reflect light for the mini LEDs 20 to improve utilization of light.

The transparent insulating layer 31 is disposed between the first conductive reflective layer 32 and the second conductive reflective layer 33 and is used to insulate the first conductive reflective layer 32 from the second conductive reflective layer 33 to prevent short circuits.

Figure 8:
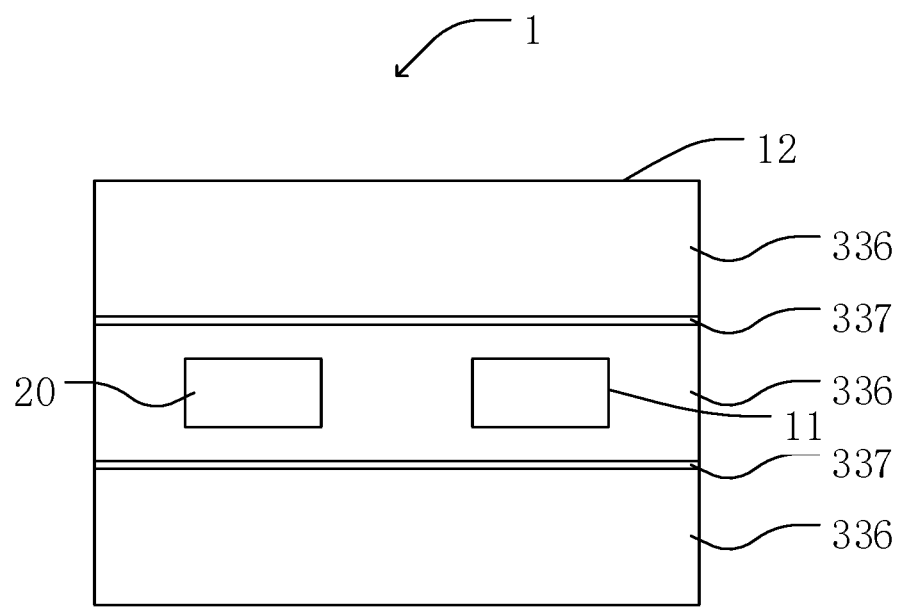
FIG. 8 is a schematic top view of a backlight module according to embodiment 3 of the present disclosure.

The first conductive reflective layer 32 comprises a plurality of fifth reflective wirings 323 arranged on the substrate 10. Two of the adjacent fifth reflective wirings 323 are in parallel with each other and a fourth gap 324 is defined between them. The second conductive reflective layer 33 comprises a plurality of sixth reflective wirings 336 arranged on the transparent insulating layer 31. As shown in FIG. 8, the mini LEDs 20 are disposed on a part of the sixth reflective wirings 336. Two of the adjacent sixth reflective wirings 336 are in parallel with each other and a fifth gap 337 is defined between them.

The fourth gap 324 corresponds to the sixth reflective wirings 336, and the fifth gap 337 corresponds to the fifth reflective wirings 323. In addition, a width of the fourth gap 324 is less than widths of the sixth reflective wirings 336, and a width of the fifth gap 337 is less than widths of the fifth reflective wirings 323, thereby achieving full metal coverage. When the mini LEDs 20 light up, a part of light penetrating through the fifth gap 337 can be reflected back by the fifth reflective wirings 323.

The backlight module and the display device provided in the embodiment of the present disclosure can improve reflectivity of light in the backlight module by reducing an area in a non-metal area and increasing a covering area of metals by covering with two layers of metal wirings. From simulation calculation, it can be known that the light reflectivity having coverage with two layers of metal wirings can reach 70% or even higher. Compared to current technology, the backlight module disclosed in the embodiment of the present disclosure has a higher reflectivity and a lower loss rate of light sources. In a situation having a same brightness requirement, the present disclosure can reduce an amount of mini LEDs, save production cost, and reduce electrical energy required for the display device, thereby saving energy.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims. It should be understood that the different dependent claims and the features described herein may be combined in a manner different from that described in the original claims. It should also be appreciated that features described in connection with the individual embodiments can be used in other described embodiments.

What is claimed is:

1. A backlight module, comprising:
    a substrate comprising a light-emitting area and a non-light-emitting area surrounding the light-emitting area;
    a plurality of mini light-emitting diodes (LEDs) disposed in the light-emitting area of the substrate; and
    at least one conductive reflective layer covering whole non-light-emitting area, wherein the mini LEDs are electrically connected to the at least one conductive reflective layer;
    wherein the at least one conductive reflective layer comprises:
    a first conductive reflective layer disposed on the substrate;
    a transparent insulating layer disposed on the first conductive reflective layer; and
    a second conductive reflective layer disposed on the transparent insulating layer, wherein at least one open groove is defined in the second conductive reflective layer; and
    the mini LEDs correspond to the at least one open groove and are electrically connected to the first conductive reflective layer.

2. The backlight module according to claim 1, wherein the second conductive reflective layer comprises at least one of first reflective wirings and at least one of second reflective wirings in parallel with each other, widths of the second reflective wirings are less than widths of the first reflective wirings, a first gap is defined between the first reflective wirings, the second reflective wirings, or one of the first reflective wirings and one of the second reflective wirings, and the at least one open groove corresponds to the first reflective wirings and the first gap adjacent to the first reflective wirings.

3. The backlight module according to claim 2, wherein the first conductive reflective layer comprises at least two third reflective wirings in parallel with each other, a second gap is defined between two of the at least two third reflective wirings adjacent to each other, and the second gap corresponds to one of the first reflective wirings, one of the second reflective wirings, or both of them.

4. The backlight module according to claim 1, wherein the second conductive reflective layer comprises at least two first reflective wirings in parallel with each other, and each open groove corresponds to one of the at least two first reflective wirings.

5. The backlight module according to claim 4, wherein the first conductive reflective layer comprises at least two second reflective wirings in parallel with each other, a first gap is defined between two of the at least two second reflective wirings adjacent to each other, and the first gap corresponds to one of the at least two first reflective wirings.

6. The backlight module according to claim 5, wherein a second gap is defined between two of the at least two first reflective wirings adjacent to each other, and the second gap corresponds to one of the at least two second reflective wirings.

7. A display device, comprising the backlight module according to claim 1.

8. A backlight module, comprising:
a substrate comprising a light-emitting area and a non-light-emitting area surrounding the light-emitting area;
a plurality of mini light-emitting diodes (LEDs) disposed in the light-emitting area of the substrate; and
at least one conductive reflective layer covering whole non-light-emitting area, wherein the mini LEDs are electrically connected to the at least one conductive reflective layer;
wherein the at least one conductive reflective layer comprises:
a first conductive reflective layer disposed on the substrate;
a transparent insulating layer disposed on the first conductive reflective layer; and
a second conductive reflective layer disposed on the transparent insulating layer;
wherein the mini LEDs are electrically connected to the first conductive reflective layer and/or the second conductive reflective layer; and
wherein the first conductive reflective layer comprises at least two first reflective wirings in parallel with each other, a first gap is defined between two of the at least two first reflective wirings adjacent to each other, the second conductive reflective layer comprises at least two second reflective wirings in parallel with each other, and the first gap corresponds to one of the second reflective wirings.

9. The backlight module according to claim 8, wherein a second gap is defined between two of the at least two second reflective wirings adjacent to each other, and the second gap corresponds to one of the at least two first reflective wirings.

* * * * *